(12) United States Patent
Rafailovich et al.

(10) Patent No.: US 6,339,121 B1
(45) Date of Patent: Jan. 15, 2002

(54) COMPATIBILIZER FOR IMMISCIBLE POLYMER BLENDS

(75) Inventors: Miriam Rafailovich; Jonathan Sokolov, both of Plainview; Shaoming Zhu, Stony Brook; Benjamin Chu, Setauket, all of NY (US)

(73) Assignee: The Research Foundation at State University of New York, Stony Brook, NY (US)

( * ) Notice: Subject to any disclaimer, the term of this patent is extended or adjusted under 35 U.S.C. 154(b) by 0 days.

(21) Appl. No.: 09/525,709

(22) Filed: Mar. 14, 2000

(51) Int. Cl.[7] ................................................. C08K 3/34
(52) U.S. Cl. ..................................................... 524/445
(58) Field of Search ................................. 524/442, 445

(56) References Cited

U.S. PATENT DOCUMENTS

| | | | |
|---|---|---|---|
| 3,811,904 A | 5/1974 | Zola | |
| 4,330,414 A | 5/1982 | Hoover | |
| 4,336,301 A | 6/1982 | Shaw | |
| 4,609,714 A | 9/1986 | Harris et al. | |
| 4,728,439 A | * 3/1988 | Kirker | 210/727 |
| 4,873,116 A | 10/1989 | Ancker | |
| 5,110,667 A | 5/1992 | Galick et al. | |
| 5,171,777 A | 12/1992 | Kuphal et al. | |
| 5,281,651 A | 1/1994 | Arjunan et al. | |
| 5,475,049 A | 12/1995 | Ohtomo et al. | |
| 5,739,087 A | 4/1998 | Dennis | |
| 5,844,032 A | * 12/1998 | Serrano | 524/445 |
| 5,853,886 A | 12/1998 | Pinnavaia et al. | |
| 5,883,192 A | 3/1999 | Natori et al. | |
| 5,993,769 A | 11/1999 | Pinnavaia et al. | |

OTHER PUBLICATIONS

Hasegaw, N., Kawasumi, M., Kato, M., Usuki, A, and Okada, A., "Preparation and Mechanical Properites of Polypropylene–Clay Hybrids Using a Maleic AnhydrideModified Polypropylene Oligomer," *J. of Applied Polymer Science*, vol. 67, pp. 87–92 (1998).

* cited by examiner

*Primary Examiner*—Paul R. Michl
(74) *Attorney, Agent, or Firm*—Hoffmann & Baron, LLP

(57) ABSTRACT

The present invention is polymer blend, which includes at least two immiscible polymers, and a compatibilizer used to produce a substantially homogeneous blend. The compatibilizer is a functionalized nanocomposite which prevents segregation of the polymer components in the polymer blend. The nanocomposites are formed by combining an organoclay and an intercalation agent. The intercalation agent is a reaction product of a polyamine functionalized with an alkyl halide in a polar solvent. The compatibilized blends are used in thin films, which are especially useful in microlithographic applications and as lubricants in low tolerance magnetic disks.

24 Claims, 23 Drawing Sheets

0.02 mm

DATA TYPE   HIGHT
Z RANGE     300 nm

DATA TYPE   FRICTION
Z RANGE     2.67 V

DATA TYPE   HIGHT
Z RANGE     300 nm

DATA TYPE  FRICTION
Z RANGE    2.67 V

DATA TYPE   HIGHT
Z RANGE     300 nm

DATA TYPE   FRICTION
Z RANGE     2.67 V

COMPATIBILIZER FOR IMMISCIBLE POLYMER BLENDS

This invention was made with Government support under Grant No. DMR9632525 awarded by the National Science Foundation. The Government has certain rights in the invention.

BACKGROUND OF INVENTION

The present invention relates to polymer blends and, in particular, blends of polymers, which are immiscible, and compatibilizing agents use therein.

The polymer industry is constantly searching for new polymeric materials. The mixing together of two or more polymers has been found to be a successful means of forming new property combinations without having to synthesize novel structures. However, a major problem encountered when two polymers are mixed is that, in the majority of combinations, the components tend to phase-separate to form heterogeneous mixtures that do not exhibit enhanced properties. Only in a limited number of cases do amorphous polymers blend to form one-phase mixtures. The term miscible as used herein describes a mixture of two or more polymers, which form a single-phase (solid or liquid) solution. The term immiscible is used to describe a mixture of two or more polymers, which cannot be uniformly mixed or blended to form a single-phase (solid or liquid) solution. Polymers, which can be mixed to form a miscible blend, are referred to as compatible.

Immiscible polymer blends with potentially useful properties must be compatible in order to be used in most applications. Compatible and incompatible refer to the degree of intimacy of blends. From a practical standpoint, it is useful to refer to a polymer blend as compatible when it does not exhibit substantial polymer segregation (i.e., demixing of the components of the blend). Such blends are referred to herein as miscible polymer blends. A blend that is heterogeneous on a macroscopic level would therefore be considered incompatible. The simple observation that a blend is compatible is sufficient to establish the material as potentially useful. Numerous techniques are used to determine if a polymer is single phase or multiphase. A quick but not totally reliable method is by transparency. Erroneous conclusions may be reached by this method if the refractive indexes of two polymers are similar. Microscopy is a more accurate tool for determining if a blend is single phase or multiphase. The glass transition temperature ($T_g$) of the individual polymers in the blend and the glass transition temperature of the blend itself provide insight into the nature of the blend. The glass transition temperature is the temperature at which the molecular chains have sufficient energy to overcome attractive forces and move vibrationally and transitionally.

Most polymer films are composed of two or more polymers, which are blended in order to achieve desired properties of lubrication, dielectric constant, adhesion, etc. Since polymer blends are often not miscible, phase segregation between the polymer components can be a significant problem, especially in thin films. A variety of industries, which use polymer blend films, are affected by phase segregation. For example, in microlithographic applications, phase segregation of blend films degrades the printing resolution. When blend films are used as lubricants in low tolerance magnetic disks, phase segregation can increase the aspect ratio of the film so that it exceeds the spatial tolerance. If the film is used as a lubricant or adhesive, phase segregation can degrade the quality and characteristics of the film. Also, if the film is used in color printing, phase segregation adversely affects the image quality and reproduction of color.

Block copoymers, which act as surfactants are commonly used to compatibilize films. However, they have numerous disadvantages: 1) they are expensive and complicated to synthesize; 2) they tend to form micelles rather than localize at the interface, and hence their efficiency is low; and 3) they are very system specific.

Organic solvents are used in industry as compatibilizers for hydrophobic polymers. These solvents are often aromatic and can pose a health hazard and a threat to the environment when they are disposed. As a consequence, industry is increasingly switching to less hazardous, water soluble polymers, or polymers that can be processed in supercritical fluids. The present invention provides a safe alternative to the solvents presently being used since its primary component is clay.

SUMMARY OF THE INVENTION

The present invention is a polymer blend composition including a first polymer and a second polymer, which are immiscible, and a compatibilizer. The compatibilizer includes an organoclay, which has been functionalized by an intercalation agent, whereby it has an affinity for each of the polymers. The intercalation agent is a reaction product of a polyamine and an alkyl halide in a polar solvent. The preferred alkyl halides are alkyl chloride and alkyl bromide and the preferred polar solvents are water, toluene, tetrahydrofuran, and dimethylformamide.

The first polymer and the second polymer can be a polystyrene, a polyester, a nylon, a polyolefin, an acrylic resin, a vinyl polymer, a polyalkylene oxide, such as polyethylene oxide, or an ionomer, such as a sulfonated polystyrene or a sulfonated polyolefin.

The present invention is also a method for making a thin film and the film products produced thereby. The method includes combining a first polymer and a second polymer that are immiscible and a compatibizer to form a miscible polymer blend. The compatibilizer includes an organoclay functionalized with an intercalation agent, wherein the intercalation agent is a reaction product of a polyamine and an alkyl halide in a polar solvent. The first polymer has a first glass transition temperature and the second polymer has a second glass transition temperature. The compatibilized polymer blend is then formed into a film, preferably by a spin cast method and on a silicon wafer. In a preferred embodiment, the first polymer, the second polymer and the compatibilizer are combined in a solvent, such as water, toluene, tetrahydrofuran or dimethylformamide.

Films formed from the miscible polymer blends of the present invention have a thickness of from about 25 nm ("nanometers") to about 1,000 nm, preferably from about 50 nm to about 300 nm. The films formed from the compatibilized polymer blend can then be annealed at a temperature above the glass transition temperatures of the first and second polymers to enhance the properties of the film and the degree of compatibilization.

The nanocomposite compatibilizers of the present invention are more economical than block copolymers ($1.00 or less versus $1,000.00 or more per pound) and provide greater versatility. Another advantage of the present invention is that both the hydrophobic and hydrophilic surface functionalized clays, which are used in the nanocomposite compatibilizers, are available commercially. Consequently, both water-soluble and insoluble polymers can be compatibilized by this method. This versatility is not possible with the surfactants, which are now being used.

BRIEF DESCRIPTION OF THE FIGURES

Other objects and many attendant features of this invention will be readily appreciated, as the invention becomes better understood by reference to the following detailed description when considered in connection with the accompanying drawings wherein.

DETAILED DESCRIPTION OF THE INVENTION

Figure 1A:
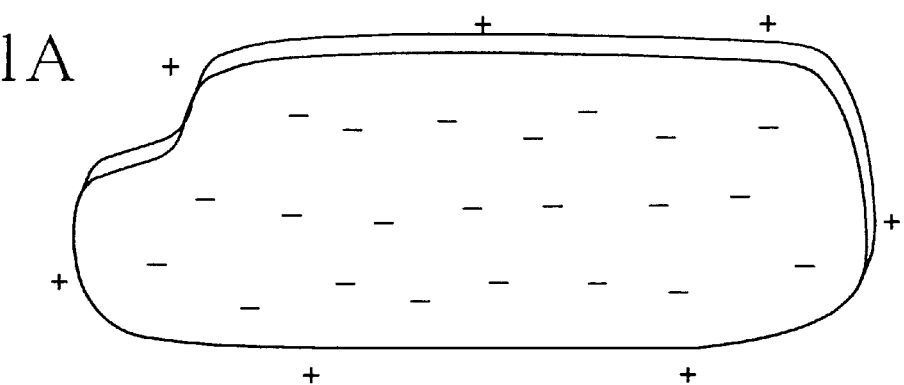
FIGS. 1a and 1b are top and side views of a negatively charged montmorillonite crystal.

The present invention is a polymer blend, which includes at least two immiscible polymers, and a compatibilizer used to produce substantially homogeneous polymer blends. Preferably, the compatibilizer is a functionalized polymer/clay nanocomposites, which possess unique properties, not found in compatibilizers used in conventional composites. The polymer/clay nanocomposites used in the present invention provide an inexpensive and efficient compatibilization of polymer blends. The polymer/clay nanocomposites can be used to blend highly immiscible polymers in thin films and to tailor the properties of the film without sacrificing film integrity, appearance and mechanical properties. These polymer blends are useful in processes for color printing, electronic packaging, lubrication, adhesion and biomedical applications. In addition, the films formed from the polymer blends have very low gas permeability and can be used in the food packaging industry.

The nanocomposite compatibilizers of the present invention are superior to the block copolymers and surfactants that are currently used to compatibilize polymers. The degree of compatibilization is measured by the size of the microdomains of the two polymers that are compatibilized. Smaller microdomains indicate that the polymers have been compatibilized to a higher degree. When clay is used to compatibilize polymers, the observed microdomains are significantly smaller than the observed microdomains for block copolymers and surfactants. In addition to compatibilizing immiscible polymers, the polymer/clay nanocomposites also mechanically reinforce the materials, making the films more stable to mechanical wear. This is especially important if the films are used as lubricants. Exfoliated clay (i.e., clay that has been intercalated so that adjacent platelets can be dispersed individually throughout a matrix polymer or throughout a carrier material, such as water, an alcohol or glycol, or any other organic solvent) is also known to act as a barrier to gas and small molecule diffusion when the clay particles are oriented. Special processing of these films, i.e. shear alignment or spin casting can also be used to produce orientation. This can impart the films with additional properties, such as impermeability to air or viruses, which are useful in biomedical or food packaging applications.

The nanocomposite compatibilizers of the present invention can also be used in paints, toners and pigments as an inexpensive alternative to the copolymers and surfactants currently being used. The nanocomposite compatibilizers provide improved color, texture and adhesion, as well as increased luster, ultraviolet absorption and corrosion protection.

It is well known that surfaces can markedly affect the properties of polymeric materials. The nanocomposite compatibilizers of the present invention are made of particles having large surface areas with precisely controlled surface chemistry, which can be used to form new structure, property, and performance relationships. These new "structured clays" can be used to produce polymeric materials with unique mechanical properties such as low gas permeability, light weight, high heat distortion temperatures, high impact strength, and good fire suppression. These attributes translate into new, high performance materials for packaging, automobiles, flame resistant polymers, barrier resins, processing additives, optically transparent coatings, and printable polymer surfaces.

Without limiting the invention to a particular theory of operation, it is believed that the exfoliated clay platelets of the nanocomposite compatibilizers are adsorbed at the interfaces of the different polymers. The surfactant properties of the compatibilizers derive either from adsorbed polymers on the surfaces, or simply from reducing the interfacial tension by separating highly incompatible materials. In either case, the interface at the clay/polymer interface is no longer continuous due to the interaction of the clay platelets with the polymers. The clay-modified interface has large discontinuities that increase the elastic energy of the interface. The increased elastic energy destabilizes the interface and prevents the formation of the bicontinuous structures that usually form in microemulsions. As a result of the destabilized interfaces, polymers that would otherwise be incompatible can be intimately mixed. In contrast to enthalpic compatibilization with surfactants such as block copolymers, mechanical compatibilization with the clay nanocomposites of the present invention is non-specific and allows the simultaneous compatibilization of multi-component systems.

The Polymer/Clay Nanocomposite

It has been found that the efficient compatibilization of two or more immiscible polymers can be achieved by using a layered polymer/clay nanocomposite. The layered polymer/clay nanocomposites are formed by first reducing the ionic forces which hold the layered clay platelets together to create spaces between the layers. A polymer blend intercalant is then introduced between the layers. The functional intercalant molecules penetrate the interstices of the clay galleries, and bind via electrostatic interactions, which renders the surfaces hydrophobic. The clay is then co-dissolved with the polymer blend intercalant in an organic solvent. The solvent causes the clay to exfoliate, thereby greatly increasing the surface to volume area.

The individual platelets of the clay are held together by strong ionic forces. The key to producing the functionalized nanocomposite materials of the present invention is to reduce the interaction energy caused by these ionic charges efficiently and effectively. The ionic forces can be reduced considerably by screening the charges with a polar solvent such as water. In a dilute solution, the clay layers are substantially separated into individual layers. In order for the individual clay platelets to remain separated, a low molecular weight material is added to the solution. The preferred low molecular weight material is a cationic surfactant which intercalates (i.e., the cations diffuse along the planes of the crystal lattices, forming a layer between the planes) to the platelet surface, preventing the ionic charges from interacting when the solvent is removed. These functionalized clays can be solution or melt blended with a variety of polymers to form what are referred to as polymer nanocomposites.

The polymer nanocomposites are a new class of composites that have a substantially reduced level of filler. As used herein, filler is defined as the inorganic material in the polymer matrix. Typical clay filler concentrations in the polymer nanocomposites of the present invention are from about 5 to about 25 percent by weight, and preferably from about 10 to about 15 percent by weight. In contrast, typical concentrations of other fillers, such as carbon black, are in excess of 30 weight percent. The unique properties of the polymer nanocomposites of the present invention, that is, their high aspect ratio of the platelets, their large surface to volume ratio, and their interaction with polymers, make them particularly useful as inexpensive polymer compatibilizers.

The coverage of the clay platelets with the functionalized groups is only partial, which results in the creation of hydrophobic and hydrophilic microscopic areas. These microscopic areas are used to bind the two immiscible polymers and result in a compatibilized blend of the two polymers.

A preferred layered polymer/clay nanocomposite is a commercially available dimethyl, di-tallow ammonium functionalized montmorillonite clay. This material is relatively inexpensive (approximately $1.00/lb), and is often used as a packing material. This functionalized montmorillonite clay is commercially available from numerous manufacturers, such as American Colloid, Southern Clay Products and Sud Chemie. The nanocomposites of the present invention are described in U.S. Pat. No. 5,739,087 to Dennis, which is incorporated herein in its entirety by reference.

The addition of from about 1% by weight to about 30% by weight of clay to polymer blends improves the compatibilization of immiscible polymers to varying degrees. The addition of 5% by weight of clay significantly improves compatibilization, but is often not enough to insure that the polymer blend will be substantially compatibilized. The optimal amount of clay in a polymer/clay nanocomposite has been found to be between about 10% and about 20% by weight. The addition of more than 20% by weight of clay does not significantly improve compatibilization for most blends. At concentrations greater than 30% by weight, the clay begins to segregate and can adversely affect the properties of films made from the polymer blends.

The Clay Component

The synthesized polymer/clay nanocomposite materials are formed from layered clays that are available throughout the world. The layered structures of these clays provide the nanocomposites with unique properties. In their native state, the clay particles are made up of many layers of stacked platelets having a thickness of approximately 10A which are held together by strong ionic forces.

The clay used as a starting material is a smectite-type clay. The unique characteristic of smectite that sets it apart from other minerals is its ability to disperse and swell in water and other polar liquids. There are many different types, or species, of smectite and the chemical nomenclature of smectite can vary and is, therefore, often misleading The two species of smectite of the greatest commercial importance and value are montmorillonite (magnesium aluminum silicate) and hectorite (classified as magnesium silicate). This difference in chemical composition leads to a difference in crystal shape. Montmorillonites tend to have a sheet morphology; whereas, hectorite tends to have a lath or strip morphology. The commercial availability of hectorite is very limited, but montmorillonite deposits are vast.

The three properties that make smectite unique and commercially important are its particle size, particle shape and particle charge. Smectite crystals have a flat thin sheet morphology. They are irregular in overall shape and can be up to 1,000 nm (10,000 Angstroms) in the largest dimension. However, a side view of the crystal reveals a uniform size of 0.92 nm thickness. The result of this morphology is an extremely large surface area of about 800 square meters per gram. Surfaces of smectite particles tend to structure water that is in close proximity to them. Therefore, the greater the surface area, the greater the affect. Particle size is also important because dispersed smectite particles are in the colloidal range. The colloidal range is actually a gray zone in that the particles do not fit into well-defined categories. They are too big to be true solutions, but too small to have the bulk properties of larger particles. The key factor of the colloidal particle size is its interaction with gravity in a liquid. Not only does the resistance of the fluid impede the downward pull of the colloidal particle from gravity, but the impact of the molecules of the liquid upon the colloidal particles results in the continuous motion of the particle in the suspension. This phenomenon is known as the Brownian Motion.

Figure 1B:
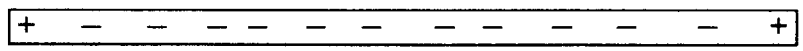
Figure 2A:
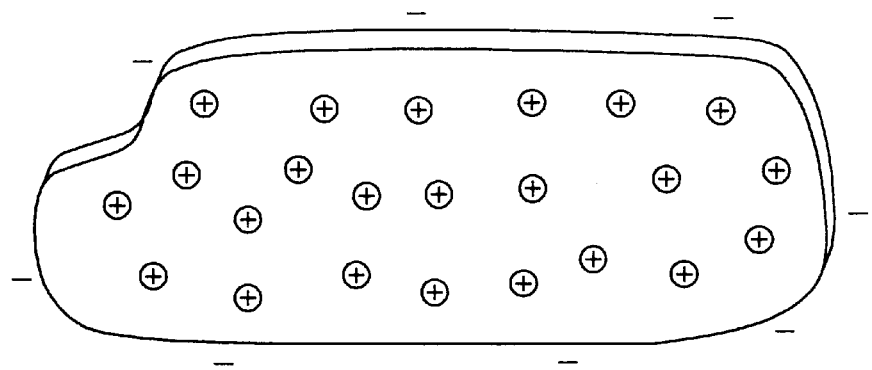
FIGS. 2a and 2b are top and side views of a montmorillonite crystal with positively charged cations attracted to its surface.
Figure 2B:
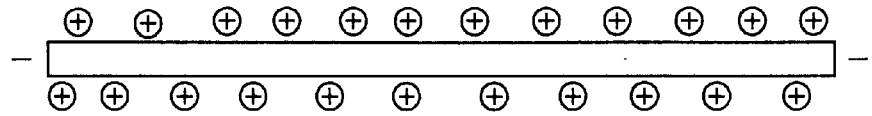

Each crystal of momtmorillonite has a large net negative charge. (See FIGS. 1a and 1b) Thus, a montmorillonite crystal tends to attract any positive ions (cations), such as calcium or sodium ions, to its surface. If the majority of these cations are sodium, it is commonly referred to as a sodium bentonite (montmorillonite). If the majority of the ions on the clay surface are calcium, it is referred to as a calcium bentonite (montmorillonite). The net negative charge is located inside the crystal itself. Therefore, cations tend to be attracted to the surface of the particle in an effort to neutralize the charge. The edge of the crystal has a few positive charges thus attracting negatively charged ions or molecules. (See FIGS. 2a and 2b)

The cations on the clay surface can be easily exchanged for other cations. A measure of this capacity is commonly referred to as the cation exchange capacity (CDC) and is usually expressed as milliequivalents of cations per hundred grams of clay.

The structure of montmorillonite or hectorite is such that it consists of an octahedral layer in between tetrahedral layers. The base unit of clay consists of three octahedral spaces plus their associated tetrhedal sheets. If two of the octaheal spaces in the unit cell are filled with alumina and the third is empty, it is said to be a dioctahedral smectite, that is a montmorillonite. If on the other hand, all three spaces of the octahedral are filled with magnesium, it is a trioctahedral smectite or hectorite.

Figures 3A, 3B:
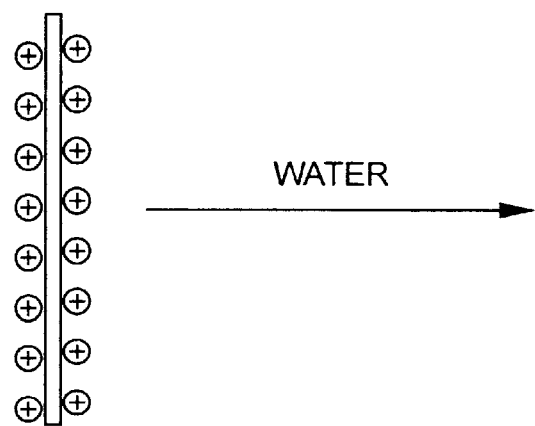
FIG. 3a shows counter ions attracted to a clay surface.
FIG. 3b shows the steady condition on a clay surface when water is introduced.

The shape, size and charge of the smectite crystals have a great influence on determining what happens during hydration. This can best be demonstrated by discussing what happens to a single smectite crystal upon hydration. When a smectite crystal is introduced to water, the osmotic pressure differential of the water tends to diffuse the ions that are closely associated with the clay surface. These ions are associated with the clay surface due to the electrostatic surface charge. As the osmotic pressure pulls the ions away from the clay surface, the electrostatic charges tend to hold the ions close to the surface. Eventually there is a steady state achieved between the osmotic pressure and the electrostatic forces. This sets up what is commonly referred to as a double layer region. (See FIGS. 3a and 3b) This double layer region tends to be an energy barrier regarding particles associating in a surface to surface configuration. If another particle is added to the bulk liquid, two things can happen. First, the particles can approach each other in a surface to surface configuration. In this case the double layers, consisting of cations, tend to repel one another. Second, the particles can approach each other from a surface to edge configuration. When this happens, a stable condition is established between the positive surface ions and the negative edge ions, thus setting up a "house of cards" structure. If enough clay is present, all of the water will be tied up in these double layers resulting in a gel formation (steady state).

Any disturbance of this steady state, such as shear, tends to disrupt the structure and aligns the clay particles. The net affect of this action is a reduction in the viscosity. This reduction will continue as long as shear is applied. However, as the shear force decreases, the particles tend to orient themselves, as before, that is a surface to edge configuration, and the viscosity is increased. After a period of time, the viscosity is essentially the same as the original viscosity. This phenomenon is known as thixotropy. Thixotropy is one of the most important properties of smectite.

Intercalation Reactions

In an intercalation reaction, the intercalant (i.e., extra atoms or molecules) are introduced between the layers of a layered host compound. The intercalation reaction does not require the breaking of any strong chemical bonds and, therefore, the kinetic barrier to reaction is usually minimal and intercalation reactions proceed rapidly at low temperature, even at room temperature. The reaction takes place at the edges of the layers of the solid host compound, and the intercalant rapidly defuses into the interior of the host. In order for the reaction to spontaneously proceed, there must be a lowering of the free energy due to intercalation. This energy decrease is chemical or electrostatic in nature, and it must be large enough to overcome the small energy necessary to pry the layers apart. Usually, the intercalation process is reversible, even at room temperature, if a chemical or electrochemical driving force is applied. The physical properties of the host or the intercalant are often greatly changed by forming an intercalation compound.

Synthesis of Nanocomposites

In forming the nanocomposites of the present invention, the preferred intercalation agent is a reaction product of a polyamine and an alkyl halide in a polar solvent. However, a variety of intercalants having a wide range of structures can be synthesized. These intercalants possess a multicharged structure that ensures an efficient intercalation process as well as effective bonding to the clay surface. In addition, these intercalants provide the capability to predictably control the distance between charges because their molecules have a uniform length, which provides uniform spacing between the clay layers. The intercalants can also be used to modify the hydrophobicity of the molecule through changes in the length of the alkyl groups and to "add" chemically reactive groups. These latter three factors can be used to control the level of interaction with the polymer matrix. For example, for a very hydrophobic polymer material, a long alkyl length would ensure good adhesion to the clay platelets, i.e., polyethylene, polypropylene, and elastomers. Conversely, a short alkyl sequence would be used to effectively disperse the clay in a polymer material that is more polar in nature, i.e., polyesters and nylons.

The synthesis procedure for the cationic intercalants includes the reaction of a polyamine with an alkyl halide (typically an alkyl bromide) in a polar solvent such as tetrahydrofuran Preferably, the alkyl halide ion possesses a carbon length of from 2 to 22 carbon atoms. After the reaction, the reaction product is isolated with a nonsolvent and dried.

Conventional intercalation agents that are presently being used are cationic compounds. A typical structure for a conventional intercalation agent is shown in equation 1.

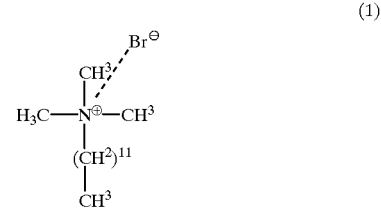

(1)

The intercalation agents of the present invention can be either reactive or nonreactive multichain cationic intercalation agents. A typical nonreactive multichain cationic intercalation agent is shown in equation 2 and a typical reactive multichain cationic intercalation agent is shown in equation 3.

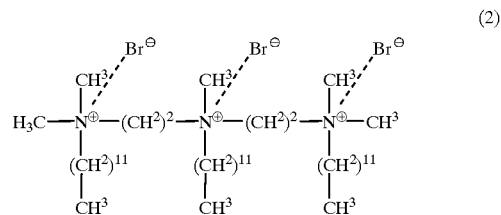

(2)

-continued

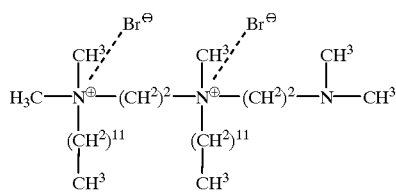

(3)

The modified intercalation agents of the present invention contain a bromine (Br) radical, which allows further functionality. For example, by adding maleic acid groups, oligomers can be polymerized directly on the clay platelets. Other groups, such as sulfonic groups, can be attached to the intercalation agents and react with the bromine radical to bind the clay to the polymer matrix. Groups can also be added to change the surface energy of the clay and thus increase the adsorbtion of polymer to the clay surface. Examples of such groups are carboxylic acid, which attracts pyridine-containing polymers or hydroxy groups that increase the surface energy and promote adsorbtion of lower energy polymers.

In order to enhance the compatibility with the polymer matrix through strong clay-polymer interaction, a wide variety of functional groups can be introduced, including ionic, hydrogen-bonding, polar, and chemically reactive functionalities. The polar and chemically active functional groups can react with functionalities present in most commercial polymers. Vinyl groups have a particularly potent reactive functionality and can bond to preformed polymers through well-known free radical procedures. These vinyl-containing clays can be copolymerized with a wide variety of commercially available monomers to produce polymer/clay compounds that are capable of forming nanocomposites in a one step process. These polymer/clay compounds contain very low volume fractions of filler and they have the added features of light weight, good dispersability, good processability, and ease of manufacturing by conventional techniques.

Immiscible Polymers

The nanocomposite compatibilizers of the present invention can be used to improve the miscibility of any polymer blend. Most polymers are immiscible with each other. Even minor chemical dissimilarities in the oligomers are amplified when the oligomers are polymerized. For example, the substitution of deuterium for hydrogen results in phase segregation in high molecular weight polymers. Phase segregation in annealed polymer films produces three-dimensional features, when one polymer spreads and wets the substrate, while the other polymer dewets and forms droplets. The contact angle formed by a droplet with the surface of the film is a measure of immiscibility. The larger the contact angle, the greater the immiscibility of the polymers. In the present invention, the degree of compatibilization can be optimized by the choice of clay surface intercalant.

EXAMPLE 1

Figure 4A:
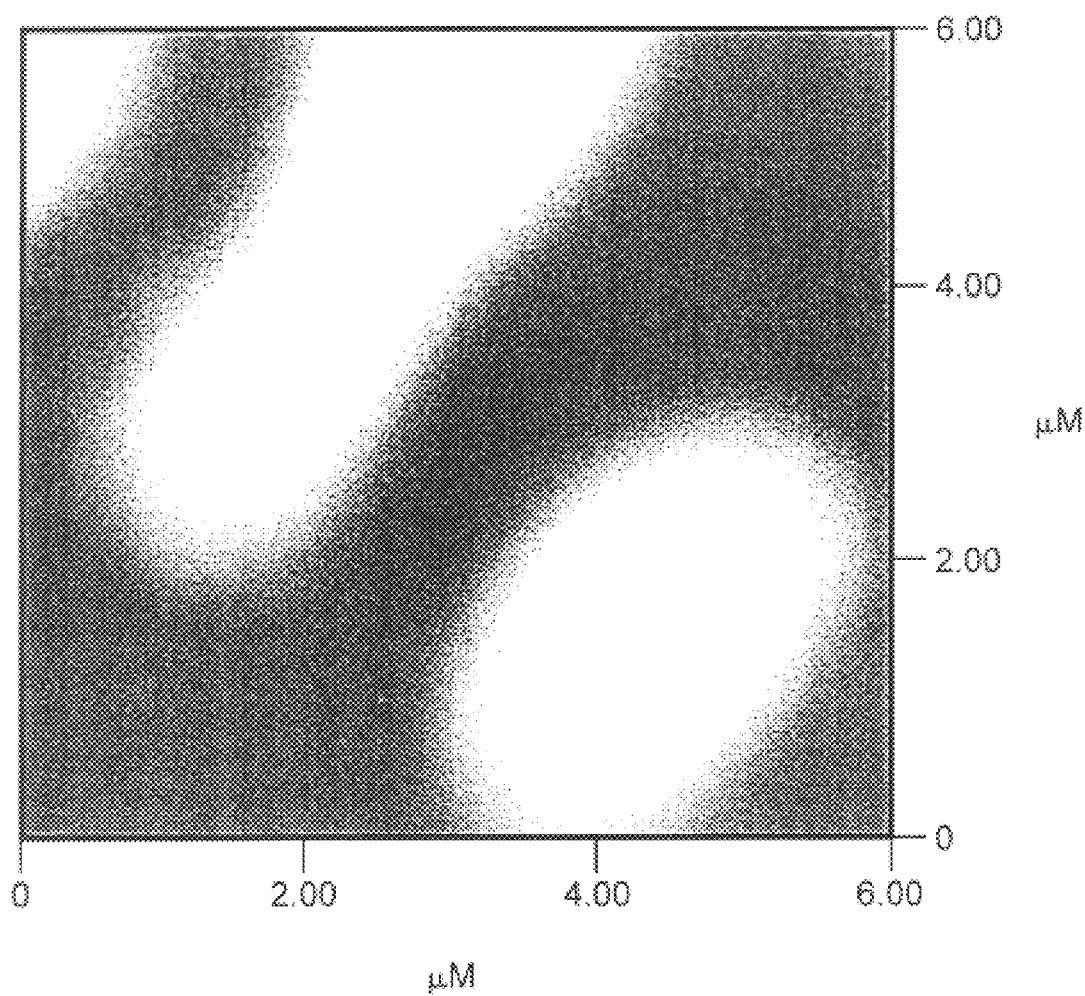
FIGS. 4a and 4b are scanning force microscopy images of a film composed of two immiscible polymers.
Figure 4B:
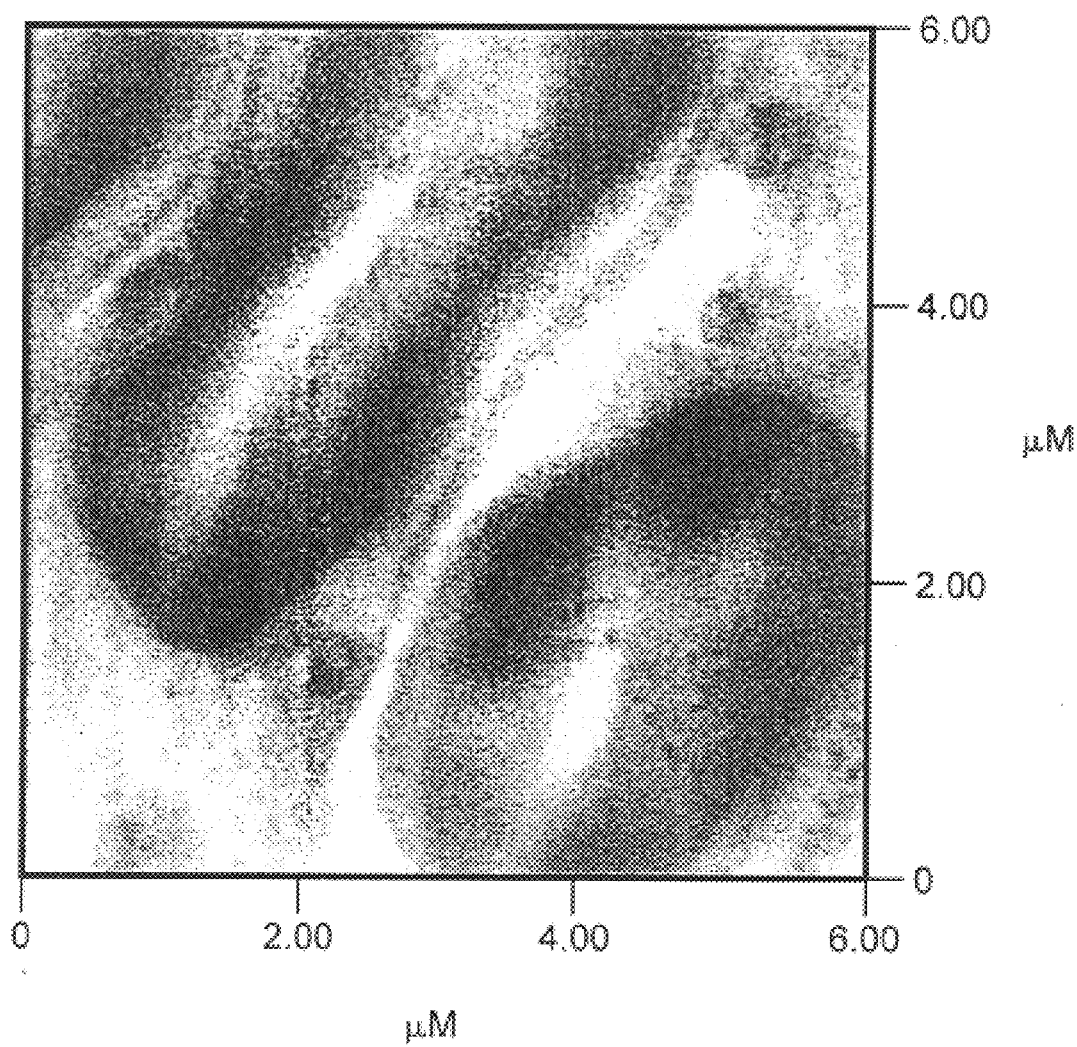

FIGS. 4a and 4b show a typical film of two immiscible polymers, in this case polystyrene ("PS") and polymethylmethacrylate ("PMMA"), which was spun cast from toluene solution and annealed to remove solvent. FIG. 4a is the topography and FIG. 4b is the frictional image as obtained by scanning force microscopy ("SFM"). The topographical features are typically much higher than the original film. The friction scan can differentiate between the two components, which have different friction coefficients when fully segregated. Large demixing of the polymer is apparent in FIG. 4a, which shows a highly irregular surface.

Figure 5A:
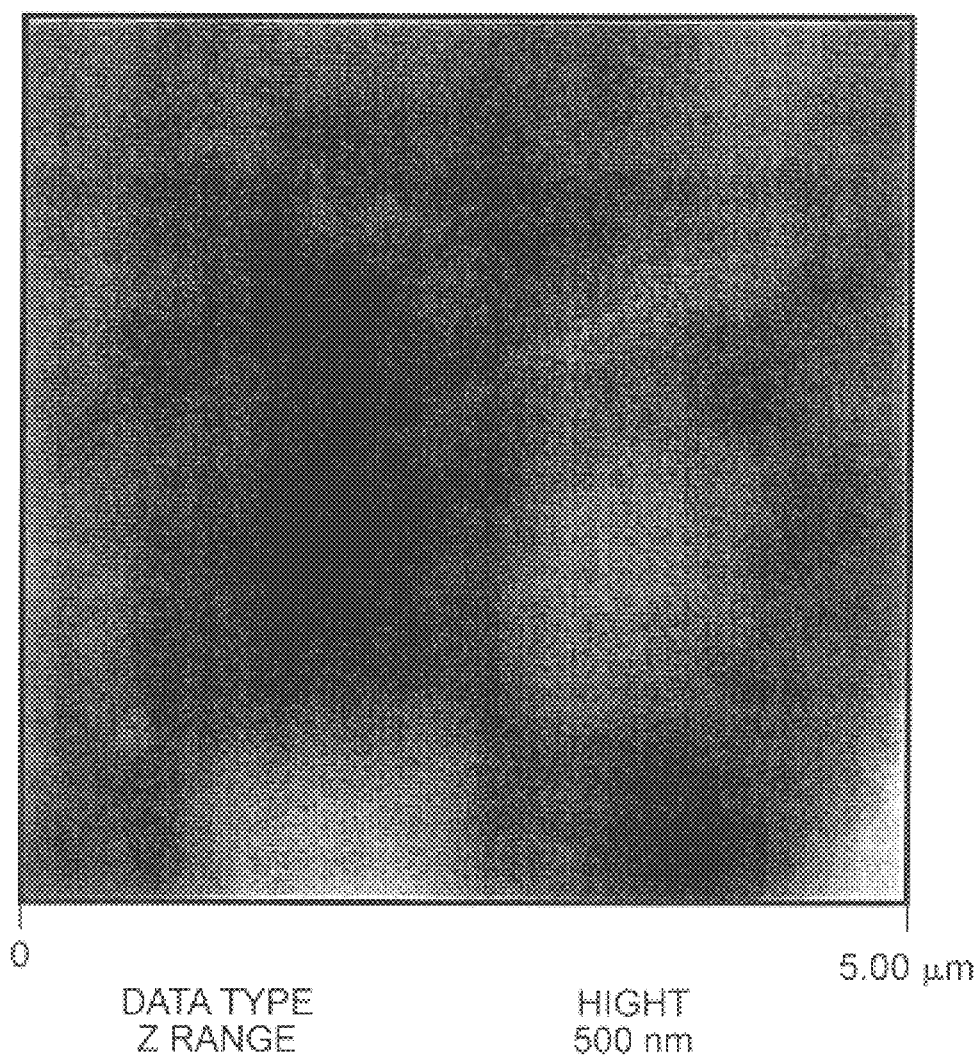
FIGS. 5a and 5b are scanning force microscopy images of a film composed of two immiscible polymers and a clay-compatibilizing agent.
Figure 5B:
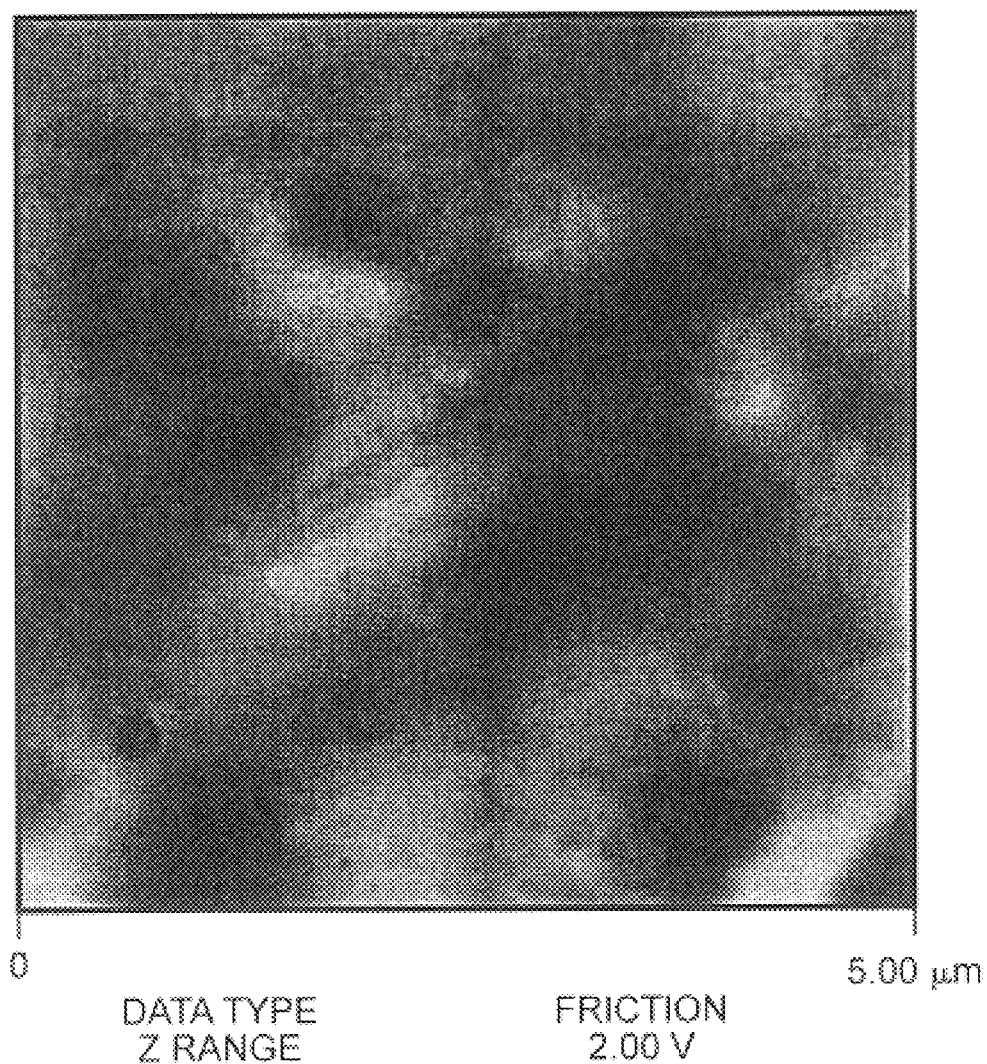

FIG. 5 shows the same film as FIG. 4, annealed at the same temperature and time, but with the addition of 20% by weight clay particles (i.e., Cloisite 6A clay). The topography image shows that the film surface is flat. The frictional contrast in the film is minimal, indicating that the two polymers are mixed on a scale smaller than the resolution of the scanning force microscope (20 nm). Rectangular low friction areas observed in the friction scan correspond to the exfoliated clay platelets.

EXAMPLE 2

Commercially available ORGANOTROL™ clay (a di-methyl, di-tallow ammonium functionalized montmorillonite clay) was dissolved in toluene together with monodisperse, narrow molecular weight distribution polystyrene ("PS") and polymethylmethacrylate ("PMMA") homopolymers of molecular weights 90,000 and 27,000 respectively. PS and PMMA are highly incompatible polymers, especially for high molecular weight chains. A control sample without clay and having the identical PS/PMMA composition was also prepared. The solutions were spin cast at 25,000 RPM on silicon wafers to produce films varying from 100 to 150 nm in thickness. The thickness was controlled by adjusting the viscosity of the solution. The thickness of a particular sample was measured after spin casting using variable angle ellipsometry. Some samples were then annealed in vacuum for 24 hours at 170° C., which is well above the glass transition of both polymers, $T_g = 100°$ C.

The morphologies of the films were then studied using atomic force microscopy and the chemical composition was imaged using scanning transmission x-ray microscopy. Both the control and the clay containing films were relatively flat after casting. (This was not surprising since toluene is a co-solvent for the two materials.) Even though the films were topographically flat, spun cast films have large remnant strains induced in the index by the shear in the spin casting process inducing large birefringence (i.e., separation of impinging light rays into two components that are at right angles to each other) and defects in the index of refraction. In addition, the rapid evaporation of the solvent results in a large density defect and micropore formation. Consequently, spun cast films are usually annealed at temperatures above their glass transition temperatures to relax the chains, restore the bulk density, remove the remnant strain and prevent delamination. When the films are made from a blend of incompatible polymers, phase segregation occurs when the films are annealed to reach equilibrium (i.e., the lowest energy configuration). In the clayless control film, the equilibrium configuration is a layer of PMMA wetting the substrate and the PS wetting the PMMA. This annealing process is also known as "Oswald Ripening" and it forms semi-spheres of PS, as the PS tries to minimize its interface with PMMA. This causes the appearance as well as the surface mechanical properties of the film to degrade and results in a segregated film, which is an inferior coating material.

In order to evaluate the effect of the clay on the thin films, the samples were then characterized using atomic and lateral force microscopy and scanning x-ray transmission microscopy. Atomic force microscopy ("AFM") provides information as to the topography or roughness of the sample. Since the clay platelets are buried inside, beneath the film surface, they cannot be detected in topography. Lateral force microscopy ("LFM"), which detects the friction of a film, is sensitive to the position of the platelets because they are harder and provide less friction than the surrounding polymer. Finally, scanning transmission x-ray microscopy ("STXM") is a technique whereby the sample is scared with x-rays of variable energy and the near edge florescence of different elements is detected. Consequently, STXM can provide an accurate chemical map of the film composition and determine the degree of compatibilization produced. Increasing compatibility implies decreasing the domains of the individual phases within the film.

The uneven topography in the polymer films made without clay is illustrated in FIG. 4a. The height of the round protrusions is approximately six times the initial film thickness, or approximately one micron for the film shown in FIG. 4a. The time development of rough morphology of films made without lay is shown in FIGS. 9f to 9j.

The addition of clay minimizes the phase segregation upon annealing. Both relaxed and spun cast films are flatter and more uniform in composition when clay is added to the polymer blend. Consequently, these films have superior mechanical, thermal and optical properties. A comparison of the STXM data in FIGS. 9a to 9e (for films that had clay added to the polymer blends) with the data in FIGS. 9f to 9j (for films that did not have clay added to the blends) shows that the domains of the films containing clay became smaller as they were annealed and that the relaxed state is even more mixed than the spun state. Although the clay platelets are too small to be seen in FIGS. 9a to 9e using STXM, they can be seen in the lateral force microscopy image in FIG. 5.

Basically, the topography of the clay-containing film is much flatter than the non-clay films, both before and after annealing. (See Example 1.) The lateral force images show that a large fraction of the film contains clay platelets. This indicates that a large amount of exfoliation takes place by the spin casting procedure. The exfoliation produces a very large increase in surface area, which makes this compatibilization effect possible. The amount of clay added, 20% by weight, is a very small fraction by volume since the density and atomic weight of the clay is an order of magnitude greater than the polymer.

EXAMPLE 3

Figure 6A:
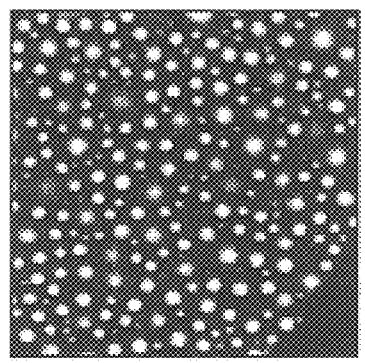
FIGS. 6a to 6f are composition map images of annealed and unannealed films composed of two immiscible polymers.
Figure 6B:
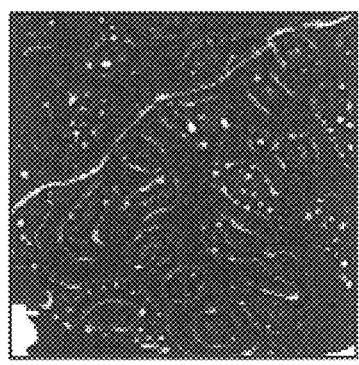
Figure 6C:
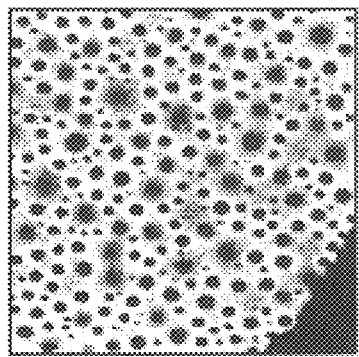
Figure 6D:
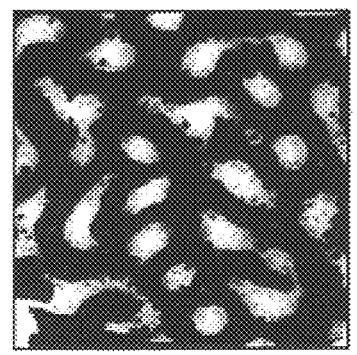
Figure 6E:
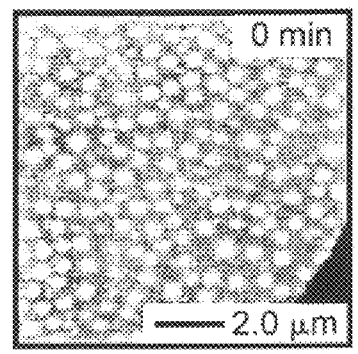
Figure 6F:
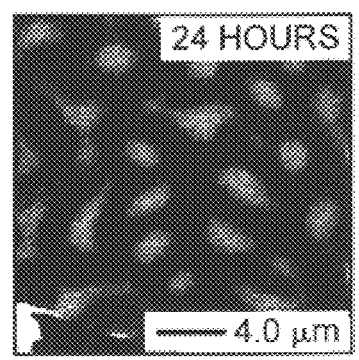

Monodisperse Polystyrene (PS) having a molecular weight of 90,000 and polymethylmethacrylate (PMMA) having a molecular weight of 27,000 were blended together and formed into annealed (at 165° C. for 24 hours) and unannealed films on a silicon ($Si_3N_4$) window without adding clay to the blend. FIGS. 6a–6f are composition maps showing the position of the PMMA (FIGS. 6a and 6b) and PS (FIGS. 6c and 6d) in the films. The figures labeled TOTAL (FIGS. 6e and 6f) are carbon density maps which are proportional to the flatness of the film. The films that are shown in FIGS. 6a, 6c and 6e were not annealed and the films that are shown in FIGS. 6b, 6d and 6f were annealed. In the absence of clay, the films are rough and large segregated domains are visible in FIGS. 6e and 6f. The segregated domains are the incompatible PS and PMMA polymers. FIGS. 6a, 6c and 6e show that the polymers in the film are slightly segregated before the films were annealed. After annealing, FIG. 6b shows that PMMA forms a flat continuous layer which dewets the substrate, while FIG. 6d shows that the PS forms droplets. FIG. 6f shows that the high droplets correspond to the PS phase.

EXAMPLE 4

Figure 7A:
FIGS. 7a to 7c are scanning transmission x-ray microscopy images of an unannealed film, composed of two immiscible polymers and a clay-compatibilizing agent.
Figure 7B:
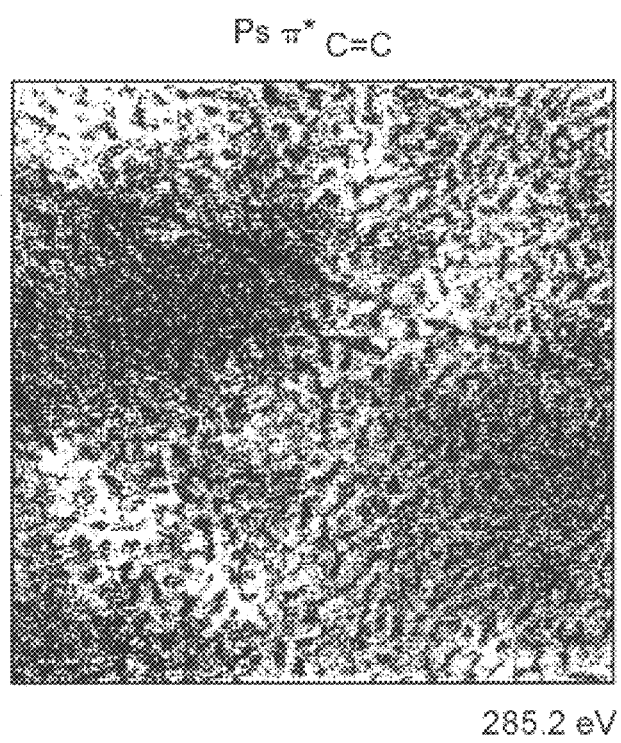
Figure 7C:
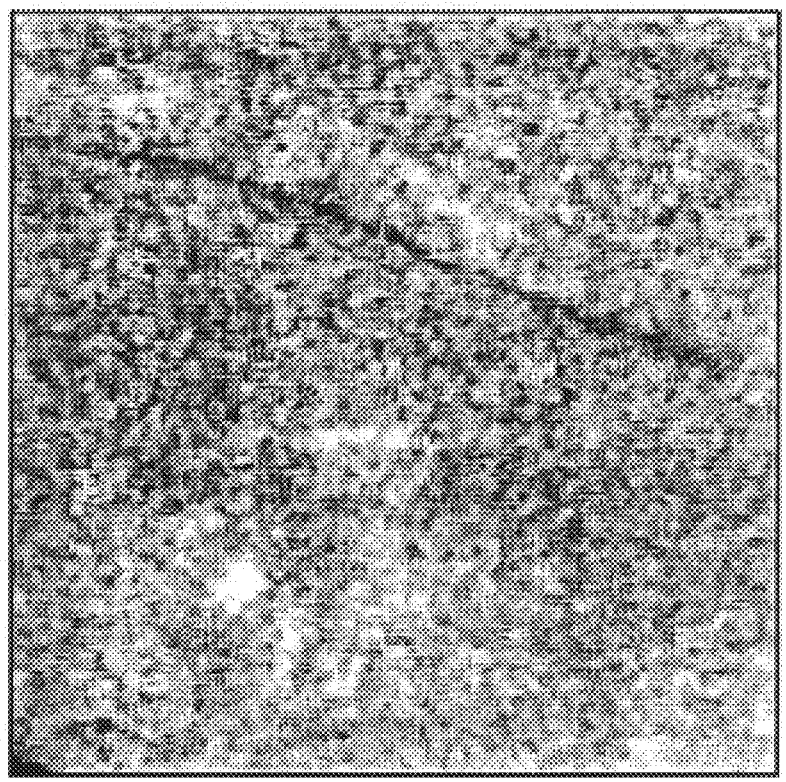

In this example, the same composition of polymers as used in Example 3 was mixed with 20% by weight Organotrol™ clay and formed into a film on a silicon ($Si_3N_4$) window. The film was not annealed before STXM was used to analyze the film structure. FIGS. 7a–7c are optical density maps that show the results. The lighter areas in the map are more highly absorbing than the darker areas. The PMMA and PS composition maps (FIGS. 7a and 7b, respectively) show that the PMMA and PS domains are very small and interconnected. The interconnectivity gives the film superior mechanical properties. The TOTAL scan in FIG. 7c shows that the film is much flatter than the films that did not include clay.

EXAMPLE 5

Figure 8A:
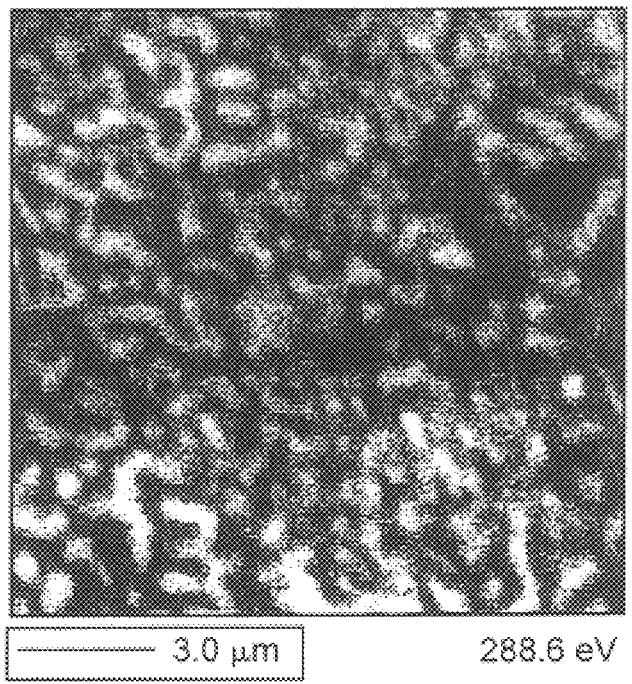
FIGS. 8a to 8c are scanning transmission x-ray microscopy images of an annealed film composed of two immiscible polymers and a clay-compatibilizing agent.
Figure 8B:
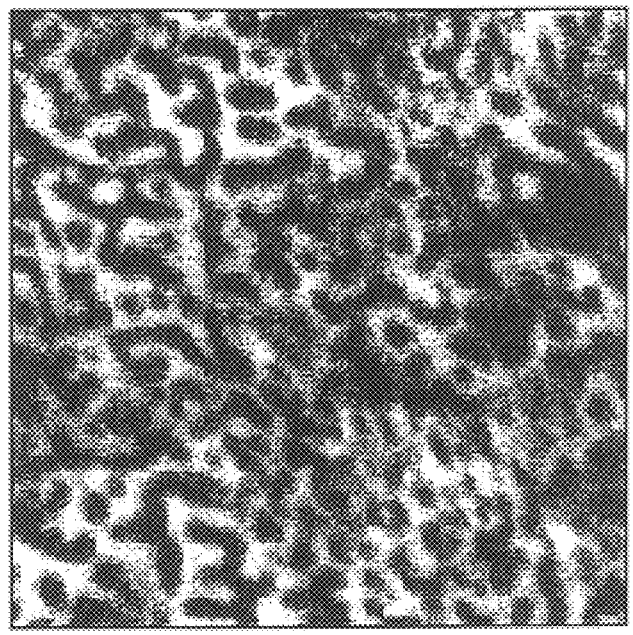
Figure 8C:
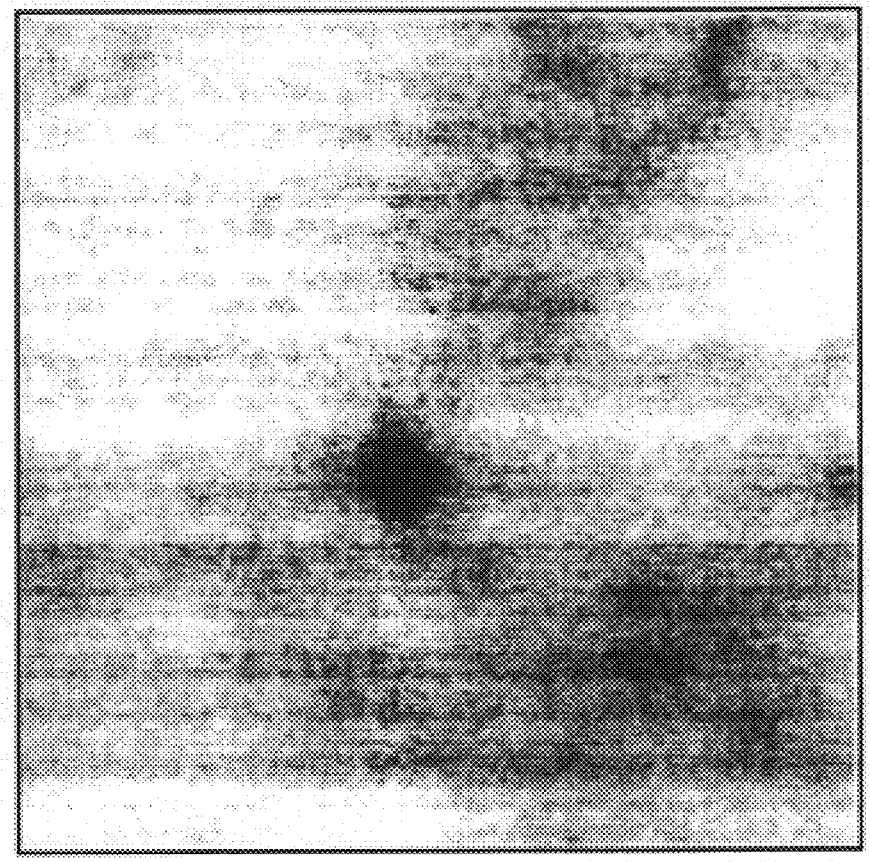

In this example, the same composition of polymers as used in Example 3 was mixed with 20% by weight Organotrol™ clay and formed into a film on a silicon ($Si_3N_4$) window. The film was then annealed for 24 hours at 175° C. before STXM was used to analyze the film structure. FIGS. 8a–8c show the results. FIGS. 8a and 8b show that the PMMA and PS domains are still interconnected, even though the domains are slightly larger than in the unannealed film. FIG. 8c shows that the surface TOTAL image is still flat.

EXAMPLE 6

Figure 9A:
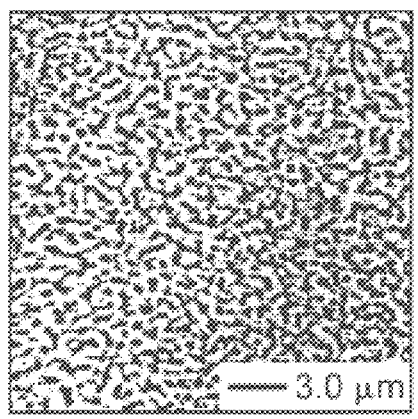
FIGS. 9a to 9j are scanning transmission x-ray microscopy images of annealed and unannealed films composed of two immiscible polymers with and without a clay-compatibilizing agent.
Figure 9B:
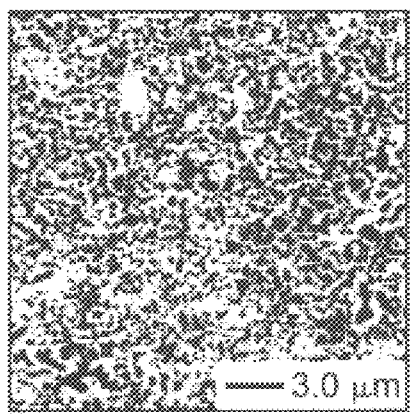
Figure 9C:
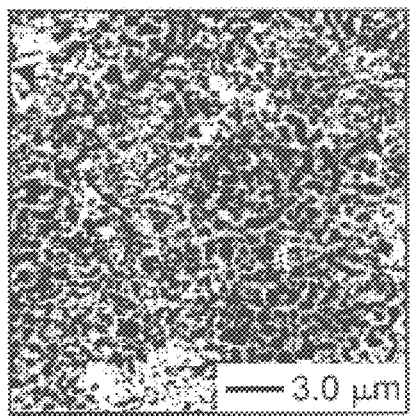
Figure 9D:
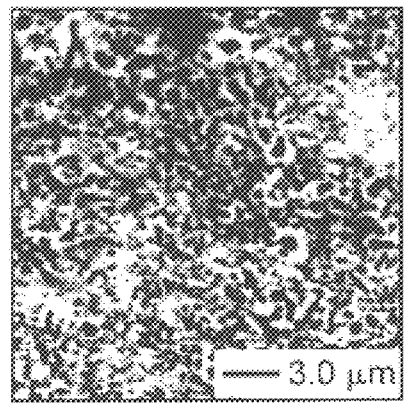
Figure 9E:
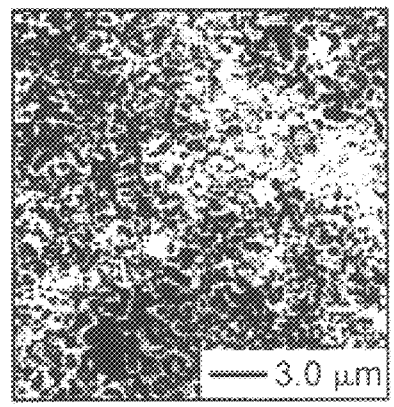
Figure 9F:
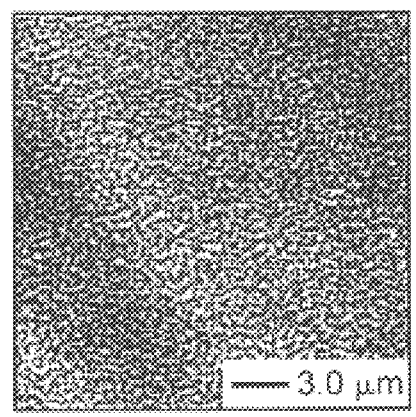
Figure 9G:
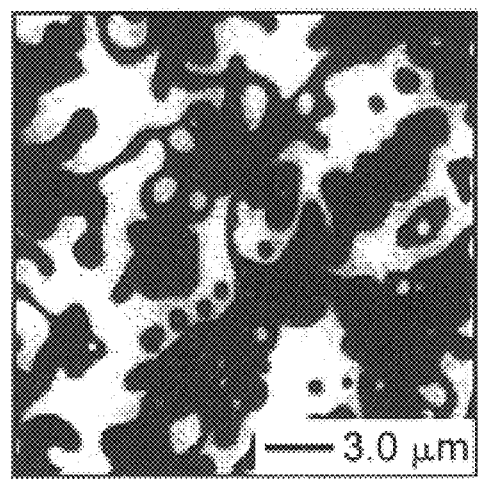
Figure 9H:
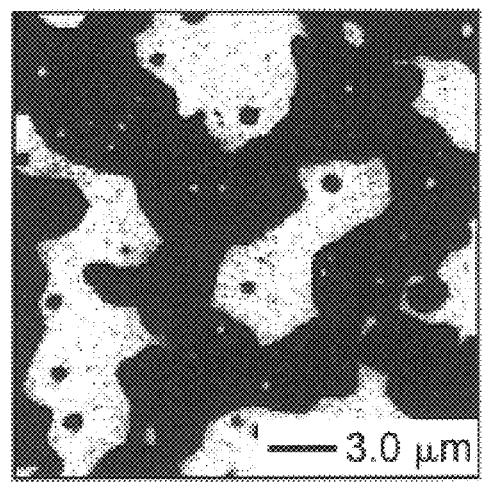
Figure 9I:
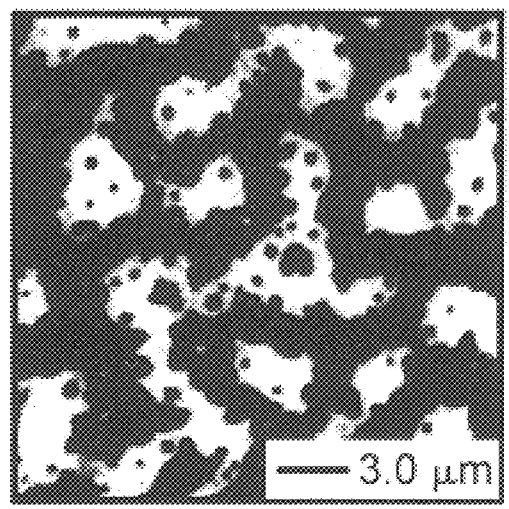
Figure 9J:
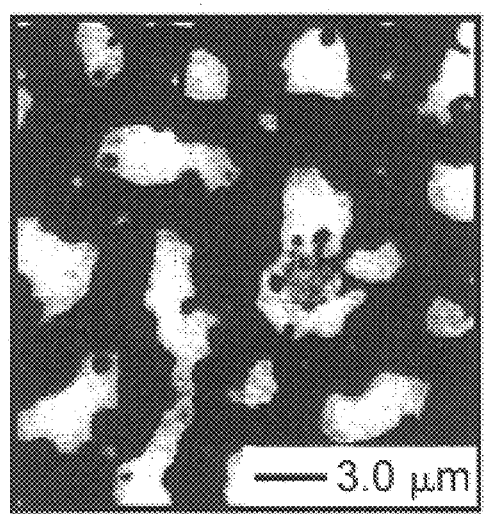

In this example, the efficacy of Cloisite™ 6A and Organotrol clay were compared. PS (Mw=90K) and PMMA (Mw=25K) were co-dissolved in toluene and a first set of films approximately 110 nm in thickness were spun cast on a silicon substrate. A second set of films were prepared in the same manner, except 20% by weight clay was added to the PS/PMMA blend before the films were formed. One film from each set was selected as a control and the remaining films were annealed in vacuum at 165° C. for from 12 to 96 hours. STMX was used to analyze the films and the results are shown in FIGS. 9a to 9j. The results for the set of films containing clay for an unannealed film and films annealed for 12, 24, 48 and 96 hours are shown in FIGS. 9a to 9e, respectively. Similar results for the set of films without clay for an unannealed film and films annealed for 12, 24, 48 and 96 hours are shown in FIGS. 9f to 9j, respectively. For clarity, the results in FIGS. 9a to 9j show only the PS concentration maps. The samples that did not contain clay (FIGS. 9f to 9j) phase segregated when they were annealed and the PS and the PMMA flow away from each other. Discontinuous domains are formed after 24 hours (FIG. 9h). The domains increase in height and become more isolated as the annealing time increases.

EXAMPLE 7

Figure 10A:
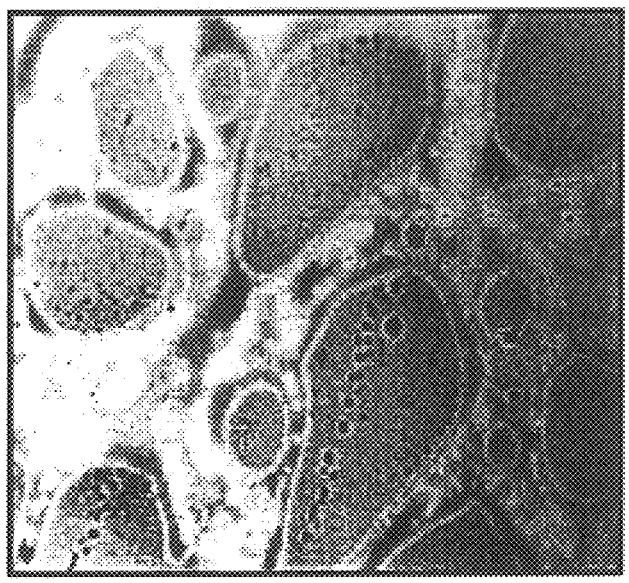
FIGS. 10a to 10d are scanning transmission x-ray microscopy images of annealed and unannealed films composed of two immiscible polymers with and without a clay-compatibilizing agent.
Figure 10B:
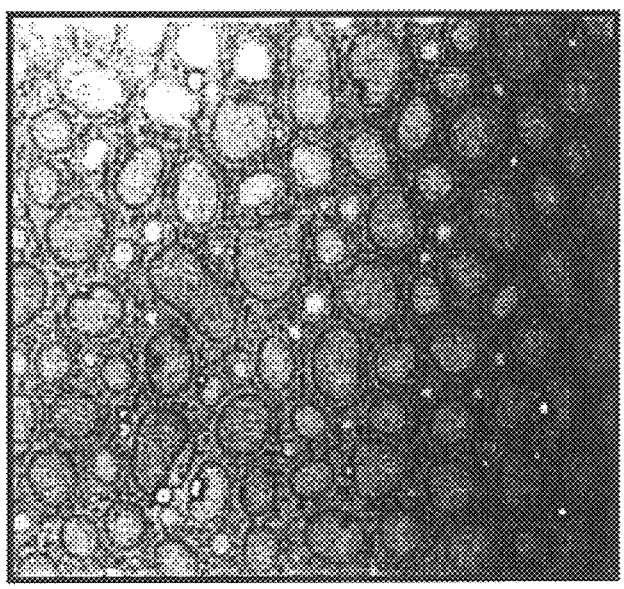
Figure 10C:
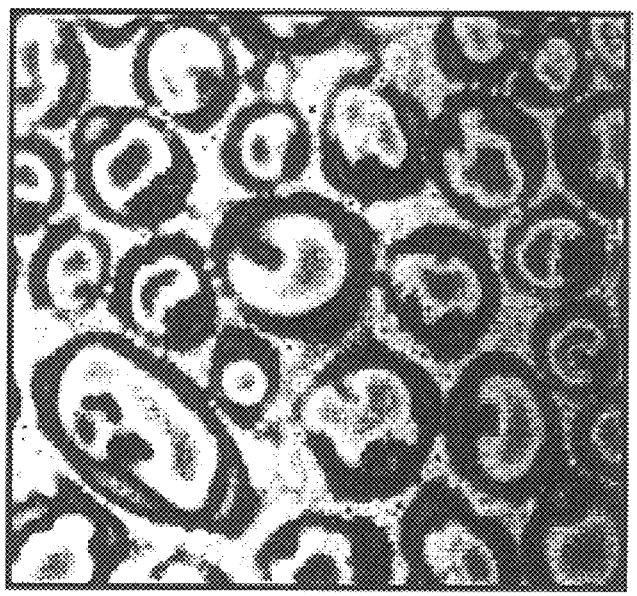
Figure 10D:
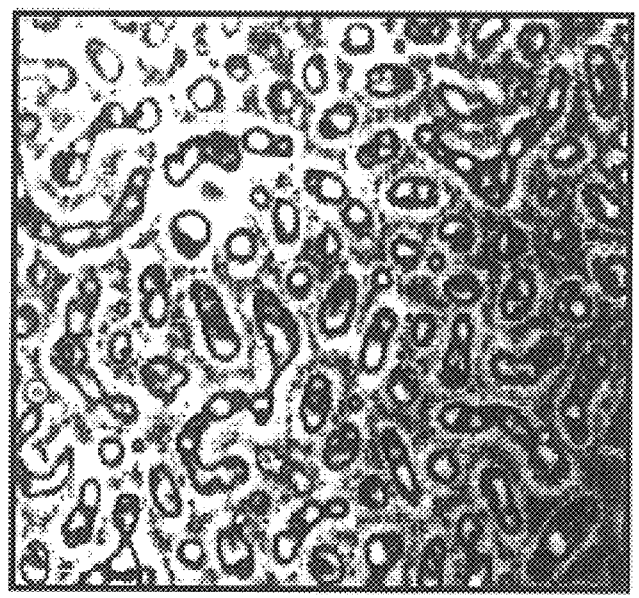

In this example, monodisperse polystyrene (PS) having a molecular weight ("Mw") of 104,000 (NM/Mn=1.04) and polyethylene propylene (PEP) having a molecular weight of 280,000 (Mw/Mn<1.04) were blended together. Five percent by weight Organotrol™ clay was added to a portion of the blend and two films were formed; one from the clay modified blend and one with no clay. FIGS. 10a to 10d are optical micrographs, which show the affect of modifying the blends with clay. FIGS. 10a and 10b are images of the unannealed films, the film in FIG. 10a was modified with clay and no clay was added to the film in FIG. 10b. FIGS. 10c and 10d are the same film samples after annealing at 150 ° C. for 24 hours in a vacuum. The images show that a dramatic decrease in phase domains is induced both the unannealed and annealed films when the clay is added.

EXAMPLE 8

In this example, brominated isobutylene polymethyl styrene ("BIMS") copolymer with 0.75% and 1.5% bromination and 3.76% and 6.1% methyl styrene fractions, respectively, was blended with polybutadiene ("PB") having a molecular weight of 233,000 Daltons. A portion of the blend was combined with 10 weight percent Cloisite™ 6A clay to form a second blend. Two sets of films having a thickness of between 100 and 500 nm were formed from these two blends. The films were annealed for 18 hours at 150° C. and then examined using optical microscopy and scanning transmission microscopy ("STXM"), using 10×10µ scans.

Figure 11A:
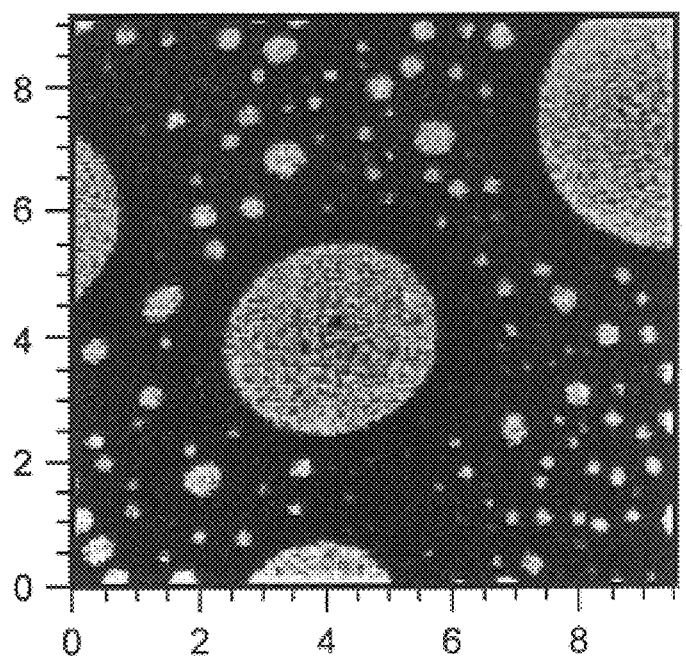
FIGS. 11a to 11d are scanning transmission x-ray microscopy images of films composed of two immiscible polymers with and without a clay-compatibilizing agent.
Figure 11B:
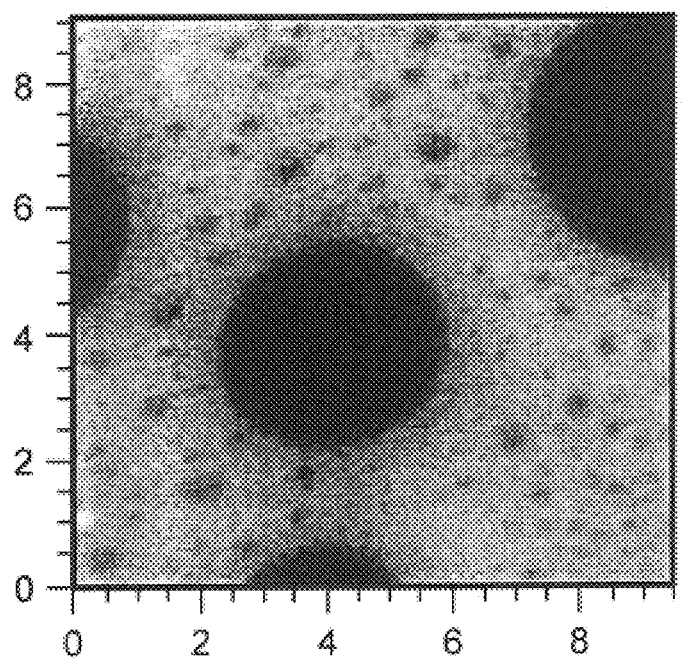
Figure 11C:
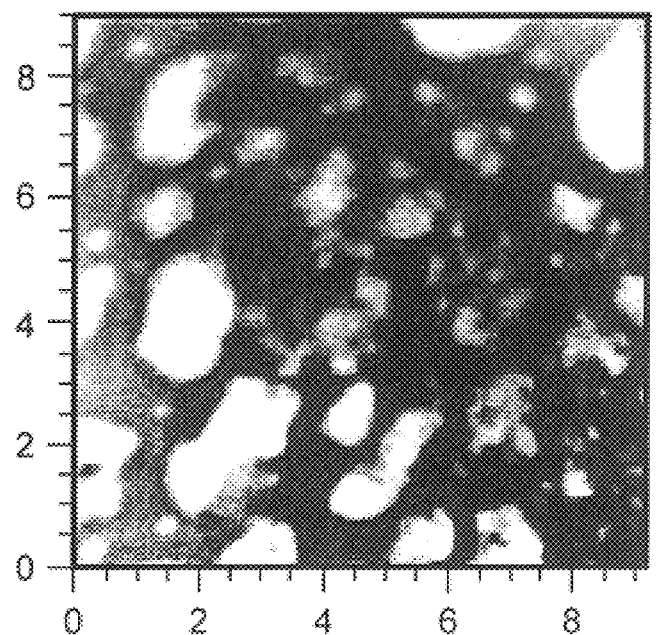
Figure 11D:
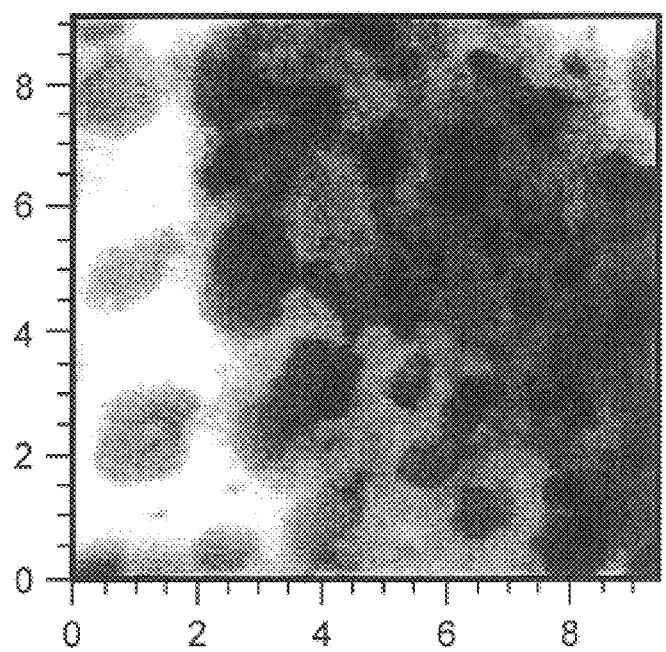

The STXM results are shown in FIGS. 11a to 11d. FIGS. 11a and 11b show the films made without clay; FIG. 11a shows the PB concentration map (i.e., the PB peaks), wherein the PB peaks appear as the dark areas, and FIG. 11b shows the BIMS concentration map (i.e., the BIMS peaks), wherein the BIMS peaks appear as the dark area. FIGS. 11c and 11d show the films made with clay; FIG. 11c shows the PB concentration map and FIG. 11d shows the BIMS concentration map. In FIGS. 11a and 11c, the PB peaks appear as the dark areas, and in FIGS. 11b and 11d, the BIMS peaks appear as the dark area.

A reduction in domain sizes similar to the results in Example 7 was observed after annealing. In the absence of clay, the PB is shown to form large spherical droplets in the BIMS matrix, which wets the $Si_3N_2$ substrate. The BIMS and PB domains show high contrast, i.e., the domains are highly segregated. By comparing the results in FIG. 11a with FIG. 11c and FIG. 11b with FIG. 11d, it is observed that the addition of the clay caused the large domains to be broken up into smaller domains with ill-defined boundaries. FIGS. 11c and 11d also show that the addition of clay caused significant intermixing of the phases in the domain.

EXAMPLE 9

In this example, differential scanning calorimetry ("DSC") was to test polystyrene ("PS") and polymethyl methyl acrylate polymers ("PMMA") blended with 10 weight percent Cloisite™ 6A clay and Organotrol™ clays. These samples were made by codissolving PEA, PS and clay. The solution was used to cast thick films on glass substrates. The films were then annealed for 24 hours at 170° C., peeled off the glass and ground into a powder. The powder was placed in the DSC sample holder and the measurements were made. The results are listed in Table 1 and show that in the absence of clay, two glass transition temperatures are observed for the blend of the two immiscible polymers. However, the addition of the clay results in a mixture having a single glass transition at 132° C. This confirms that the clay acts as a compatibilizer for the two polymers. In addition, this indicates that the materials are mixed at the molecular level, which is consistent with the result shown in FIG. 9e.

TABLE 1

DIFFERENTIAL SCANNING CALORIMETRY MEASUREMENTS OF PS, PMMA AND PS/PMMA BLENDS

| MATERIAL | GLASS TRANSITION TEMPERATURE, $T_g$ |
| --- | --- |
| PMMA | 135° C. |
| PS | 100° C. |
| PS/PMMA (50—50 mix) | 136° C./100° C. |
| PS/PMMA (50—50 mix) with 10 wt % Cloisite 6A clay | 132° C. |

EXAMPLE 10

Figure 12A:
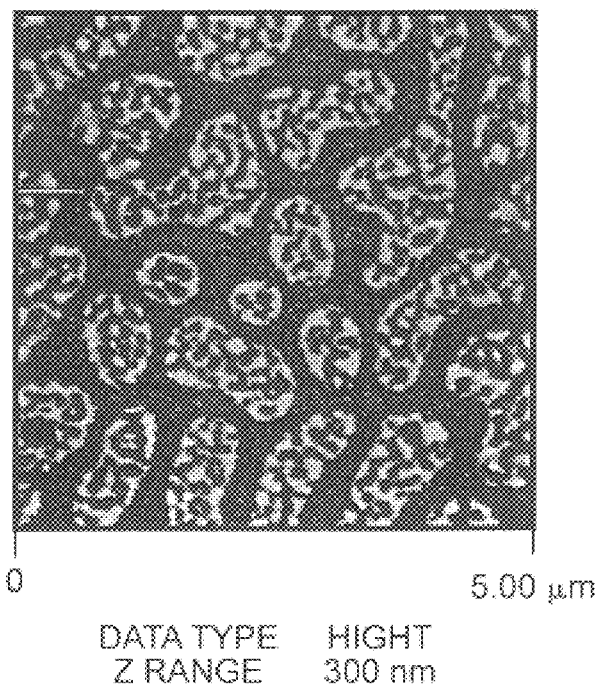
FIGS. 12a to 12f show the atomic force microscopy ("AFM") topography and friction results for films comprised of three incompatible polymers with and without a clay-compatibilizing agent.
Figure 12B:
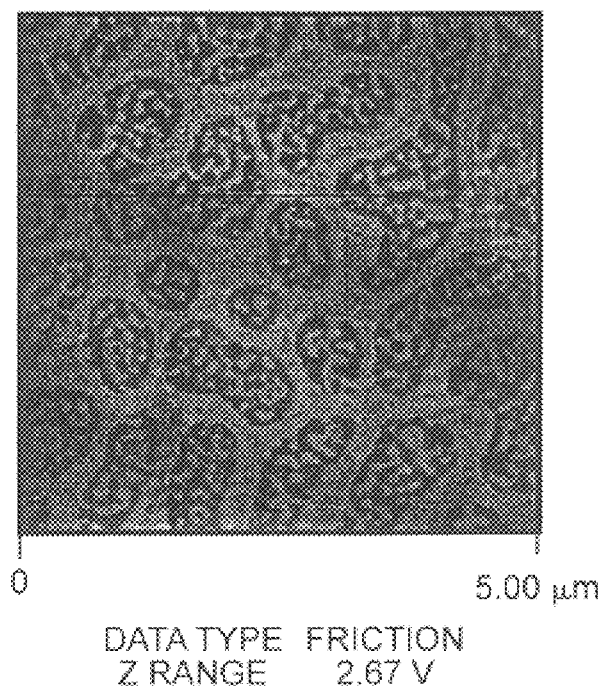
Figure 12C:
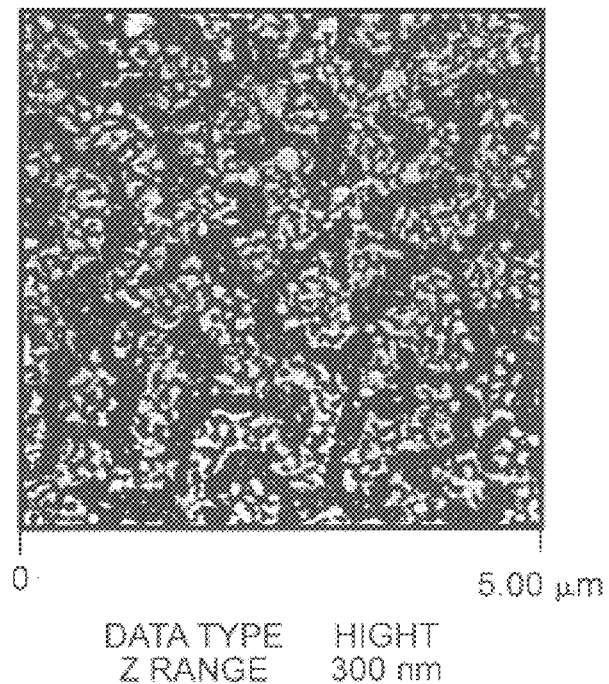
Figure 12D:
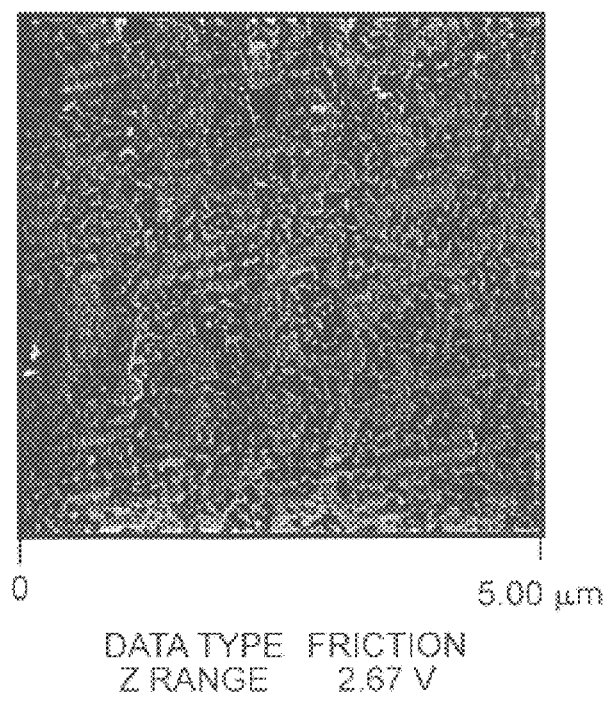
Figure 12E:
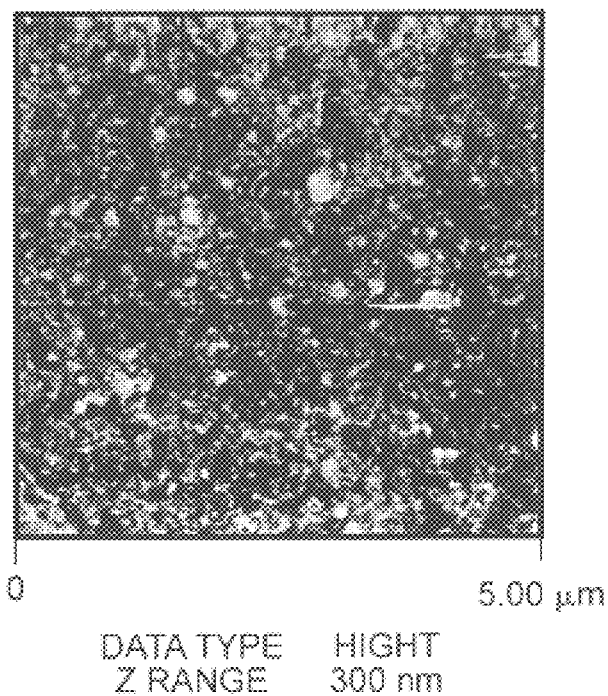
Figure 12F:
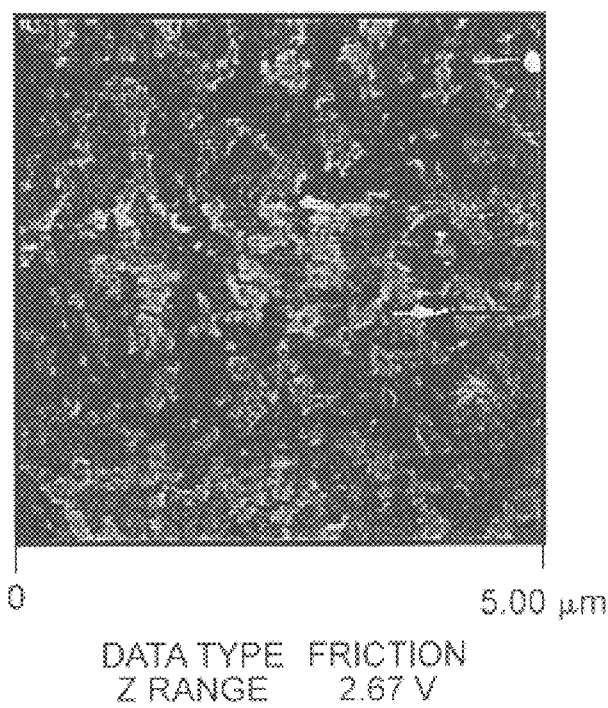

For this example, the nanocomposite compatibilizer Cloisite 6A was used to blend three incompatible polymers. Equal amounts by weight of Monodisperse Polystyrene (PS) having a molecular weight of 90,000, polymethylmethacrylate (PMMA) having a molecular weight of 27,000 and polyethylene propylene (PEP) having a molecular weight of 280,000 were blended together. The blend was then divided into three samples. Cloisite 6A was not added to the first sample. Five percent and ten percent by weight of Cloisite 6A was added to the second and third samples. Films approximately 1000 Å thick were made from all three samples and annealed at 170° C. for 24 hours. FIGS. 12a to 12f show the atomic force microscopy ("AFM") topography (FIGS. 12a, 12c and 12e) and friction results (FIGS. 12b, 12d and 12f) for the films. FIGS. 12a and 12b show the AFM topography and friction results for the film without Cloisite 6A; while FIGS. 12c and 12d and 12e and 12f show the AFM topography and friction results for films with 5% and 10% by weight of Cloisite 6A, respectively. As the figures show, the films with 5% and 10% Cloisite 6A are less segregated than the film that did not contain the Cloisite 6A.

The discovery that the compatibilizers of the present invention can be used for blends of more than two different polymers is particularly useful when it is necessary to compatibilize a blend of unknown polymers. Waste streams of recycled polymers are difficult to separate and do not blend together. The compatibilizers of the present invention provide a means for combining a plurality of unidentified polymers into a homogeneous blend.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A miscible polymer blend composition comprising:
   a first polymer;
   a second polymer, wherein said first and second polymers are immiscible; and
   a compatibilizer comprising an organoclay functionalized with an intercalation agent, wherein said intercalation agent is a reaction product of a polyamine and an alkyl halide in a polar solvent.

2. The miscible polymer blend composition of claim 1, wherein said first polymer is a polystyrene, a polyester, a nylon, a polyolefin, an acrylic resin, a vinyl polymer, a polyalkylene oxide or an ionomer.

3. The miscible polymer blend composition of claim 1, wherein said second polymer is a polystyrene, a polyester, a nylon, a polyolefin, an acrylic resin, a vinyl polymer, a polyalkylene oxide or an ionomer.

4. The miscible polymer blend composition of claim 3, wherein said ionomer is a sulfonated polystyrene or a sulfonated polyolefin.

5. The miscible polymer blend composition of claim 1, wherein said alkyl halide is alkyl chloride or alkyl bromide.

6. The miscible polymer blend composition of claim 1, wherein said polar solvent is water, toluene, tetrahydrofuran or dimethylformamide.

7. A method for making a film comprising:

combining a first polymer having a first glass transition temperature and a second polymer having a second glass transition temperature, wherein said first polymer and said second polymer are immiscible, and a compatibilizer to form a miscible polymer blend, wherein said compatibilizer comprises an organoclay functionalized with an intercalation agent, and wherein said intercalation agent is a reaction product of a polyamine and an alkyl halide in a polar solvent; and forming a film from said miscible polymer blend.

8. The method for making a film according to claim 7, further comprising annealing said film at a temperature above said first and said second glass transition temperatures.

9. The method for making a film according to claim 7, wherein said first polymer is a polystyrene, a polyester, a nylon, a polyolefin, an acrylic resin, a vinyl polymer, a polyalkyene oxide or an ionomer.

10. The method for making a film according to claim 7, wherein said second polymer is a polystyrene, a polyester, a nylon, a polyolefin, an acrylic resin, a vinyl polymer, a polyalkylene oxide or an ionomer.

11. The method for making a film according to claim 10, wherein said ionomer is a sulfonated polystyrene or a sulfonated polyolefin.

12. The method for making a film according to claim 7, wherein said alkyl halide is alkyl chloride or aklyl bromide.

13. The method for making a film according to claim 7, wherein said polar solvent is water, toluene, tetrahydrofuran or dimethylformamide.

14. The method for making a film according to claim 7, wherein said is formed on a silicon wafer.

15. The method for making a film according to claim 7, wherein said first polymer, said second polymer and said compatibilizer are combined in a solvent.

16. The method for making a film according to claim 15, wherein said solvent is water, toluene, tetrahydrofuran or dimethylformamide.

17. The method for making a film according to claim 7, wherein said film has a thickness of from about 25 nanometers to about 1,000 nanometers.

18. A polymer blend film comprising:

a first polymer;

a second polymer, wherein said first and second polymers are immiscible; and a compatibilizer comprising an organoclay functionalized with an intercalation agent, wherein said intercalation agent is a reaction product of a polyamine and an alkyl halide in a polar solvent.

19. The polymer blend film of claim 18, further comprising annealing said film at a temperature above said first and said second glass transition temperatures.

20. The polymer blend film of claim 18, wherein said first polymer is a polystyrene, a polyester, a nylon, a polyolefin, an acrylic resin, a vinyl polymer, a polyalkylene oxide or an ionomer.

21. The polymer blend film of claim 18, wherein said second polymer is a polystyrene, a polyester, a nylon, a polyolefin an acrylic resin, a polyvinyl, a polyalkylene oxide or an ionomer.

22. The polymer blend film of claim 18, wherein said alkyl halide is alkyl chloride or alkyl bromide.

23. The polymer blend film of claim 18, wherein said polar solvent is water, toluene, tetrahydrofuran or dimethylformamide.

24. The method for making a film according to claim 18, wherein said film has a thickness of from about 25 nanometers to about 1,000 nanometers.

* * * * *

UNITED STATES PATENT AND TRADEMARK OFFICE
CERTIFICATE OF CORRECTION

PATENT NO. : 6,339,121 B1
DATED : January 15, 2002
INVENTOR(S) : Rafailovich et al.

It is certified that error appears in the above-identified patent and that said Letters Patent is hereby corrected as shown below:

Column 2,
Line 5, now reads: "Block copoymers, which act as surfactants are commonly" should read -- Block copolymers, which act as surfactants are commonly --

Column 11,
Line 19, now reads: "films made without lay is shown in FIGS. 9f to 9j." should read -- films made without clay is shown in FIGS. 9f to 9j. --

Signed and Sealed this

Third day of September, 2002

Attest:

Attesting Officer

JAMES E. ROGAN
*Director of the United States Patent and Trademark Office*